Dec. 24, 1929.  E. G. GARTIN  1,740,684
ROCK DRILL
Filed Jan. 19, 1921
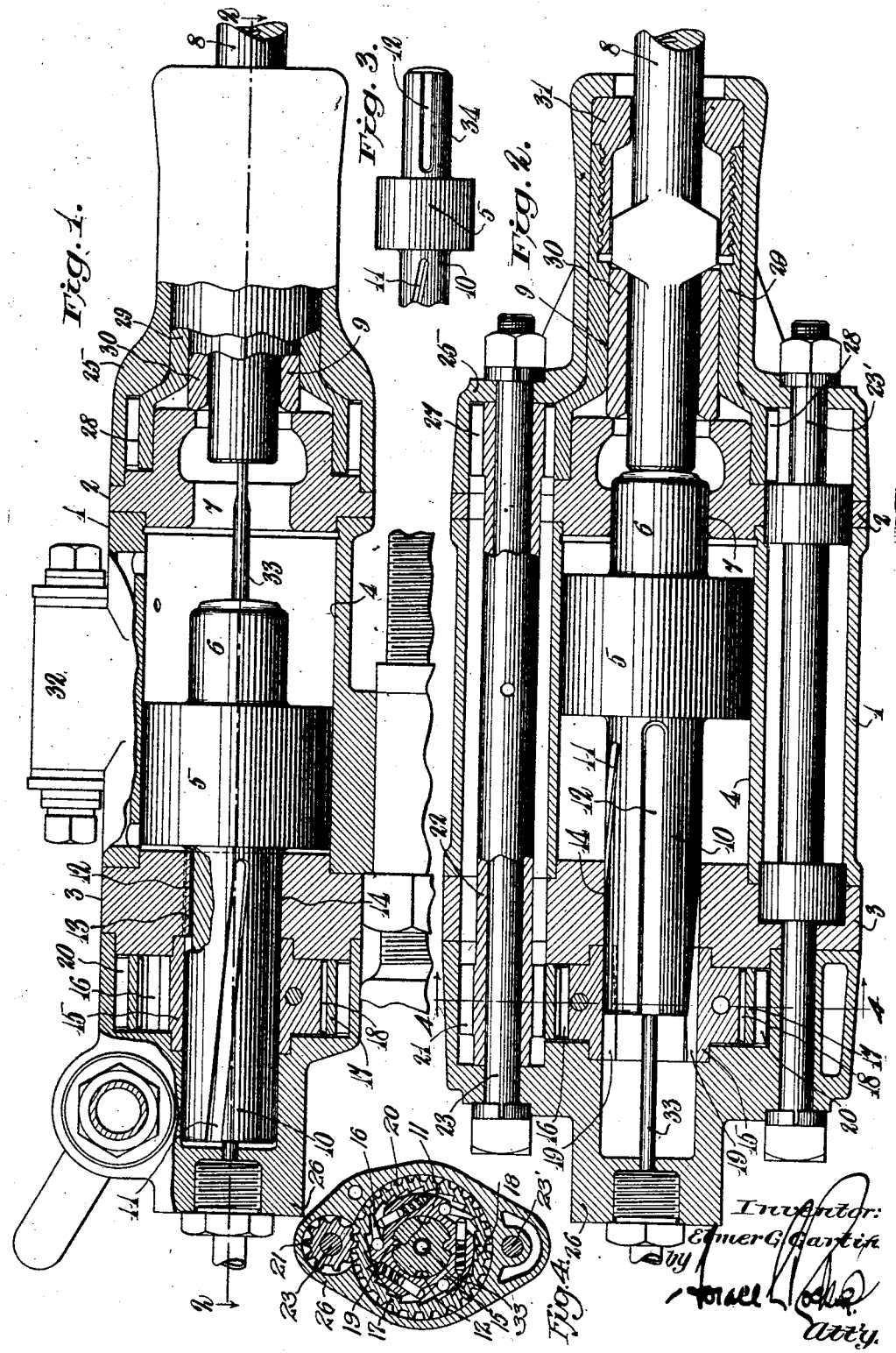
Inventor:
Elmer G. Gartin
by
atty.

Patented Dec. 24, 1929

1,740,684

UNITED STATES PATENT OFFICE

ELMER G. GARTIN, OF CLAREMONT, NEW HAMPSHIRE, ASSIGNOR TO SULLIVAN MACHINERY COMPANY, A CORPORATION OF MASSACHUSETTS

ROCK DRILL

Application filed January 19, 1921. Serial No. 38,532.

My invention relates to rock drills.

An object of my invention is to provide an improved rock drill. A further object of my invention is to provide an improved rock drill of the percussive automatic rotation type. Other objects of my invention will appear in the course of the following specification and appended claims.

In the accompanying drawings I have shown one form which my invention may assume in practice and also a possible modification of the detail construction thereof.

In these drawings,—

Fig. 1 is a central longitudinal section through the cylinder of a percussive motor embodying the illustrative form of my invention.

Fig. 2 is a section taken on the line 2—2 of Fig. 1.

Fig. 3 is a fragmentary view in elevation of a modified form of piston construction.

For purposes of illustration I have disclosed my invention embodied in a percussive motor. This motor comprises a cylinder member 1 closed at its forward end by a head member 2 and at its rear end by a head member 3. The cylinder is provided with a bore 4 in which a piston 5 is reciprocable. The piston 5 has a striking nose 6 thereon adapted to pass through an opening 7 in the front head 2 and impact upon a drill steel 8 mounted for rotation in a chuck 9 to be later more fully described.

According to the illustrative form of my invention, the piston is also provided upon its rear end with an extension 10 of cylindrical shape and of a diameter considerably less than the diameter of the piston but arranged coaxially with the latter. The extension 10 is provided with a pair of oppositely arranged spiral grooves 11 and a pair of straight grooves 12, the straight grooves being adapted to cooperate with keys or lands 13 projecting into an opening 14 formed in the rear head 3, the grooves 12 and lands 13 preventing rotation of the piston. Cooperating with the spiral groove 11 is an oscillatable pawl-carrier 15 provided with pawls 16 and adapted by means of the latter to cause rotation of a spur gear 17 which has internal ratchet teeth 18 formed thereon for engagement by the pawls. The pawl carrier 15 is provided with spirally disposed lands 19 which cooperate with the spirally disposed grooves 11. The spur gear 17 has peripheral teeth 20 which mesh with a spur gear 21 formed upon a sleeve 22 rotatable upon a side rod 23, which side rod, together with another indicated by 23', serves to connect the front and back heads, the cylinder member, a chuck housing 25, and a rear cover member 26 in rigid relation. The sleeve member 22 is provided at its forward end with a second spur gear 27 which meshes with a spur gear 28 formed upon the exterior of a chuck member 29 forming a part of the chuck 9 referred to above. In addition to the member 29 the chuck 9 also comprises a chuck bushing 30 which is disposed within the member 29 and a locking ring 31 also secured in rigid relation to the chuck member 29.

From the foregoing description, it will be obvious that as the piston reciprocates under the action of fluid pressure alternately supplied to the opposite ends thereof in a well-known manner under control of a valve, not shown, located in a valve chest 32, the rear extension or tail rod 10 will prevent rotation of the piston, but will cause oscillation of the pawl carrier 15 and so a resultant intermittent rotation of the spur gear 17, the bushing 22 and the chuck member 29 and thereby of the drill steel.

As indicated above, the rear end of the drill is enclosed in a cover member 26, into which the extension or tail rod 10 moves upon the backward stroke of the piston. Mounted coaxially with the tail rod in the rear end of the member 26 is a cleansing fluid supply tube 33 which extends forwardly through the piston into the rear end of the drill steel 8 as shown in Fig. 1.

As shown in Fig. 3, it is obviously possible to place the straight grooves upon an extension corresponding in position to the striking nose 6 of Fig. 1 in which case, however, such an extension, herein numbered 34, will not withdraw completely from the front head member 2 and the lands 13 will be formed upon the front head 2.

While I have in this specification specifically described one form which my invention may assume in practice, together with a possible variation thereof, it will be understood that this form of the same is shown for purposes of illustration and that my invention may be modified and embodied in various other forms without departing from its spirit or the scope of the appended claims.

What I claim as new and desire to secure by Letters Patent is:—

1. In a rock drill, in combination, a cylinder, a piston reciprocable in said cylinder, front and rear heads for said cylinder, side rods connecting the heads, a pawl carrier housed in said rear head, a spur gear having ratchet teeth formed upon the interior thereof and cooperating with said pawl carrier, a tail rod upon said piston having straight and spiral grooves formed therein and cooperating with said pawl carrier and constituting the sole actuating means therefor, mechanism intermeshing with said spur gear and carried by a side rod for transmitting rotation from the rear end of said cylinder to the forward end thereof, and a chuck member disposed in the front head of said cylinder and rotatable by said transmission mechanism.

2. In a rock drill, in combination, a cylinder, a rear head therefor having a chamber formed therein, a front head, side rods connecting the heads, a piston reciprocable in said cylinder and having a smooth cylindrical forwardly projecting striking bar formed thereon, a pawl carrier disposed in said chamber, a spur gear disposed in said chamber concentric with said pawl carrier and having internal ratchet teeth formed thereon with which the pawls of said carrier cooperate, a tail rod formed on said piston and extending rearwardly into said chamber, said tail rod having straight and spiral grooves formed thereon, lugs formed on said rear head member cooperating with said straight grooves, lugs formed on said pawl carrier cooperating with said spiral grooves, a spur pinion meshing with said spur gear, a longitudinally extending sleeve shaft journaled on a side rod and to which said pinion is secured, a spur pinion secured to the forward end of said shaft, a drill steel receiving chuck rotatably mounted within the forward end of the drill, and a spur gear secured to said chuck and with which said latter pinion meshes.

In testimony whereof I affix my signature.

ELMER G. GARTIN.